United States Patent
Muzquiz et al.

(10) Patent No.: US 10,054,245 B2
(45) Date of Patent: Aug. 21, 2018

(54) VALVE ASSEMBLY WITH VENT PORT BETWEEN SUPPLY PORT AND CONTROL PORT

(71) Applicant: DELPHI TECHNOLOGIES IP LIMITED, St. Michael (BB)

(72) Inventors: Guillermo Muzquiz, Chihuahua (MX); Cesar C. Chavez, Chihuahua (MX)

(73) Assignee: DELPHI TECHNOLOGIES IP LIMITED (BB)

( * ) Notice: Subject to any disclaimer, the term of this patent is extended or adjusted under 35 U.S.C. 154(b) by 0 days.

(21) Appl. No.: 15/380,071

(22) Filed: Dec. 15, 2016

(65) Prior Publication Data
US 2018/0172175 A1   Jun. 21, 2018

(51) Int. Cl.
*F16K 3/26* (2006.01)
*F16K 31/06* (2006.01)
*F01L 1/344* (2006.01)

(52) U.S. Cl.
CPC ... *F16K 31/0662* (2013.01); *F01L 2001/3443* (2013.01); *F16K 31/0637* (2013.01); *Y10T 137/7922* (2015.04); *Y10T 137/86678* (2015.04)

(58) Field of Classification Search
CPC ....... Y10T 137/86678; Y10T 137/7922; F16K 31/0662; F01L 2001/3443
See application file for complete search history.

(56) References Cited

U.S. PATENT DOCUMENTS

| | | | |
|---|---|---|---|
| 5,894,860 A * | 4/1999 | Baldauf | B60T 8/3665 |
| | | | 137/596.17 |
| 6,904,934 B2 * | 6/2005 | Runge | G05D 16/2013 |
| | | | 137/596.17 |
| 7,481,242 B2 | 1/2009 | Golovatai-Schmidt et al. | |
| 8,607,823 B2 | 12/2013 | Fischer | |
| 8,746,279 B2 | 6/2014 | Muzquiz et al. | |
| 9,016,663 B2 | 4/2015 | Moreno et al. | |
| 2005/0061374 A1 * | 3/2005 | Hameister | G05D 16/2013 |
| | | | 137/596.17 |
| 2005/0189510 A1 | 9/2005 | Golovatai-Schmidt et al. | |
| 2006/0272714 A1 * | 12/2006 | Carrillo | F16K 31/0637 |
| | | | 137/596.17 |
| 2011/0089350 A1 | 4/2011 | Beneker et al. | |
| 2015/0345343 A1 | 12/2015 | Lee et al. | |

* cited by examiner

*Primary Examiner* — Craig Schneider
*Assistant Examiner* — Kevin Barss
(74) *Attorney, Agent, or Firm* — Joshua M. Haines

(57) ABSTRACT

A valve assembly includes a housing with a bore, a supply port in fluid communication with the bore, a control port in fluid communication with the bore, and a vent port in fluid communication with bore such that the vent port is located at a location of the housing that is between the supply port and the control port. A valve seat assembly with a valve seat body is disposed within the housing and defines a control chamber in constant fluid communication with the control port, a vent path from the control port to the vent port, and a supply passage which provides constant fluid communication from the supply port to the control chamber. A vent valve member is selectively seated and unseated with the vent valve seat to selectively prevent and permit fluid communication from the control port to the vent port respectively.

17 Claims, 4 Drawing Sheets

US 10,054,245 B2

VALVE ASSEMBLY WITH VENT PORT BETWEEN SUPPLY PORT AND CONTROL PORT

TECHNICAL FIELD OF INVENTION

The present invention relates to a valve assembly, more particularly to a valve assembly which controls fluid flow between a supply port and a control port and between the control port and a vent port, and even more particularly to such a valve assembly where the vent port is located between the supply port and the control port.

BACKGROUND OF INVENTION

Valve assemblies for controllably diverting the flow of fluids are well known which include a supply port, a control port, and a vent port. In general terms, the supply port receives fluid from a fluid source while a valve member within the valve assembly is moved into and out of contact with a valve seat. When the valve member is seated with the valve seat, communication between the supply port and the control port is permitted and communication between the control port and the vent port is prevented. In this way, fluid is received at the working at a relatively high pressure. Conversely, when the valve member is not seated with the valve seat, communication between the control port and the vent port is permitted, thereby causing the pressure at the control port to decrease. Also when the valve member is not seated with the valve seat, communication between the supply port and the control port is often prevented. An example of such a valve assembly is shown in U.S. Pat. No. 9,016,663 to Moreno et al., hereinafter referred to as Moreno et al.

A common usage for valve assemblies such as those disclosed by Moreno et al. is to variably actuate engine control subsystems such as multi-step or valve deactivation mechanisms for valve train which is responsible for opening and closing combustion valves which allow combustion constituents into combustion chambers and which allow exhaust constituents out of the combustion chambers of an internal combustion engine. These multi-step or valve deactivation mechanisms, hereinafter referred to as working devices, switch between a first mode of operation and a second mode of operation at a predetermined pressure of fluid supplied thereto by the valve assembly where one such working device is described, by way of non-limiting example only, in United States Patent Application Publication No. 2015/0345343 A1 to Lee et al., hereinafter referred to as Lee et al. In a first mode of operation of the working device of Lee et al., a high lift follower is used to open and close a combustion valve to a first magnitude. Conversely, in a second mode of operation when high pressure oil is supplied to the working device of Lee et al., a pair of low lift followers are used to open and close the combustion valve to a second magnitude that is less that the first magnitude provided by the high lift follower.

While many different port configurations of valve assemblies are known, it is most prominent to have the control port located at a location that is axially between the vent port and the supply port as shown in Moreno et al. or to have the supply port located at a location that is axially between the vent port and the control port as shown in U.S. Pat. No. 8,746,279 to Muzquiz et al., herein after referred to as Muzquiz et al. While valve assemblies such as those described by Moreno et al. and Muzquiz et al. may be satisfactory in the environments for which they are intended, some environments may require the vent port to be located at a location that is axially between the control port and the supply port. Furthermore, it may be desirable to allow fluid to be supplied to the control port at a reduced pressure at the control port even when the valve member is positioned to prevent high pressure at the control port. However, providing a valve assembly with the vent port located at a location that is axially between the control port and the supply port and also which allows fluid to be supplied to the control port at a reduced pressure at the control port even when the valve member is positioned to prevent high pressure at the control port may be difficult to implement.

What is needed is a valve assembly which minimizes or eliminates one or more the shortcomings as set forth above.

SUMMARY OF THE INVENTION

Briefly described, a valve assembly is provided for receiving a working fluid from a working fluid source and then communicating the working fluid to and from a working device that is switchable from a first mode of operation to a second mode of operation at a predetermined pressure of the working fluid. The valve assembly includes a housing with a housing control bore extending along an axis, a supply port in fluid communication with the housing control bore which receives the working fluid from the working fluid source, a control port in fluid communication with the housing control bore which communicates the working fluid to and from the working device, and a vent port in fluid communication with the housing control bore which selectively returns the working fluid to the working fluid source, wherein the vent port is located at an axial position of the housing that is between the supply port and the control port. The valve assembly also includes a valve seat assembly disposed with a valve seat body that is coaxially within the housing, the valves seat body defining a control chamber in constant fluid communication with the control port, a vent path from the control port to the vent port, and a supply passage which provides constant fluid communication from the supply port to the control chamber. The valve assembly also includes a vent valve member which is selectively seated and unseated with the vent valve seat such that the working fluid passes from the control chamber to the vent port through the vent path when the vent valve member is unseated seated with the vent valve seat and such that the working fluid is prevented from being communicated to the vent port when the vent valve member is seated with the vent valve seat.

Further features and advantages of the invention will appear more clearly on a reading of the following detailed description of the preferred embodiment of the invention, which is given by way of non-limiting example only and with reference to the accompanying drawings.

BRIEF DESCRIPTION OF DRAWINGS

This invention will be further described with reference to the accompanying drawings in which.

DETAILED DESCRIPTION OF INVENTION

Figure 1:
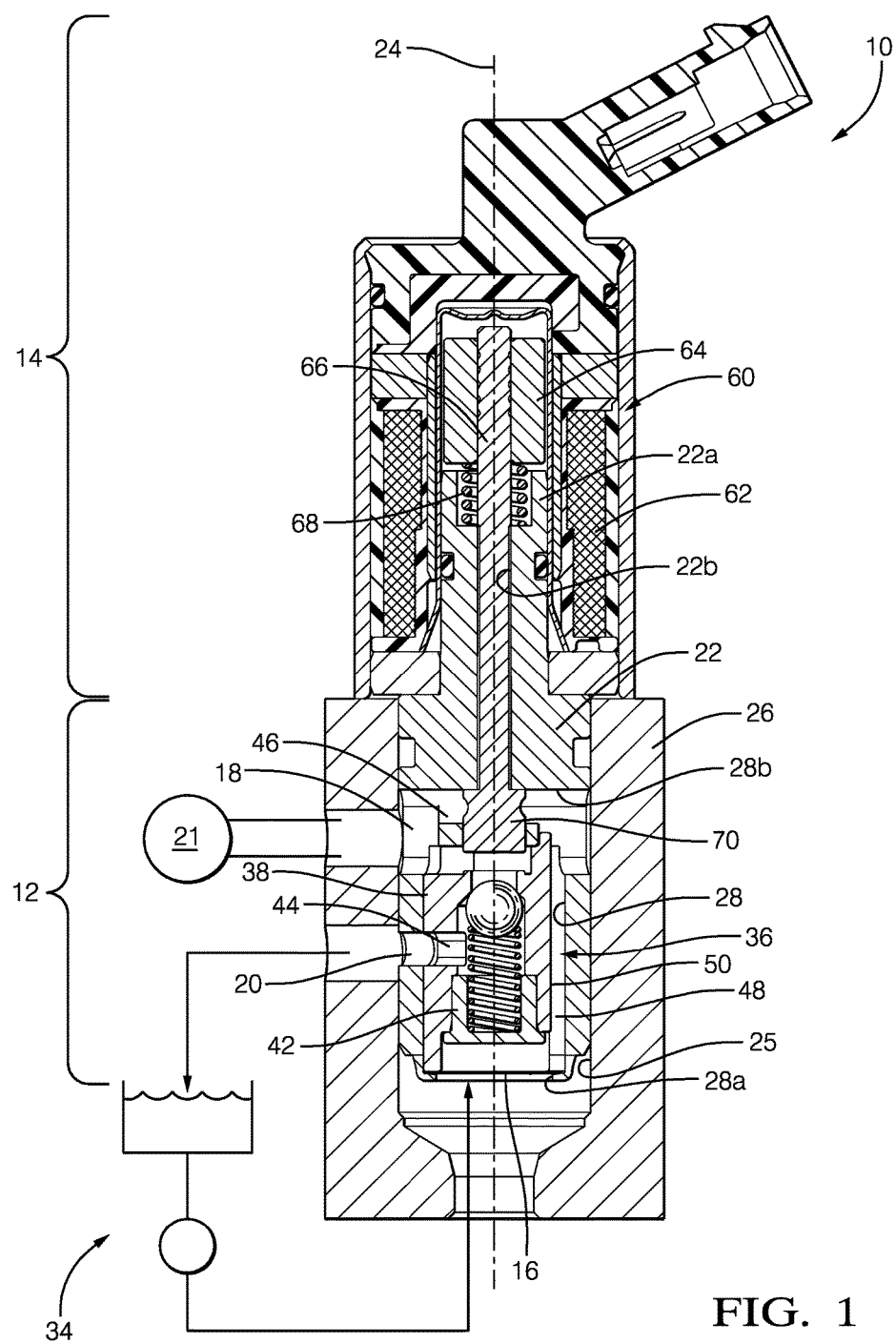
FIG. 1 is an axial cross section of a valve assembly in accordance with the present invention.
Figure 2:
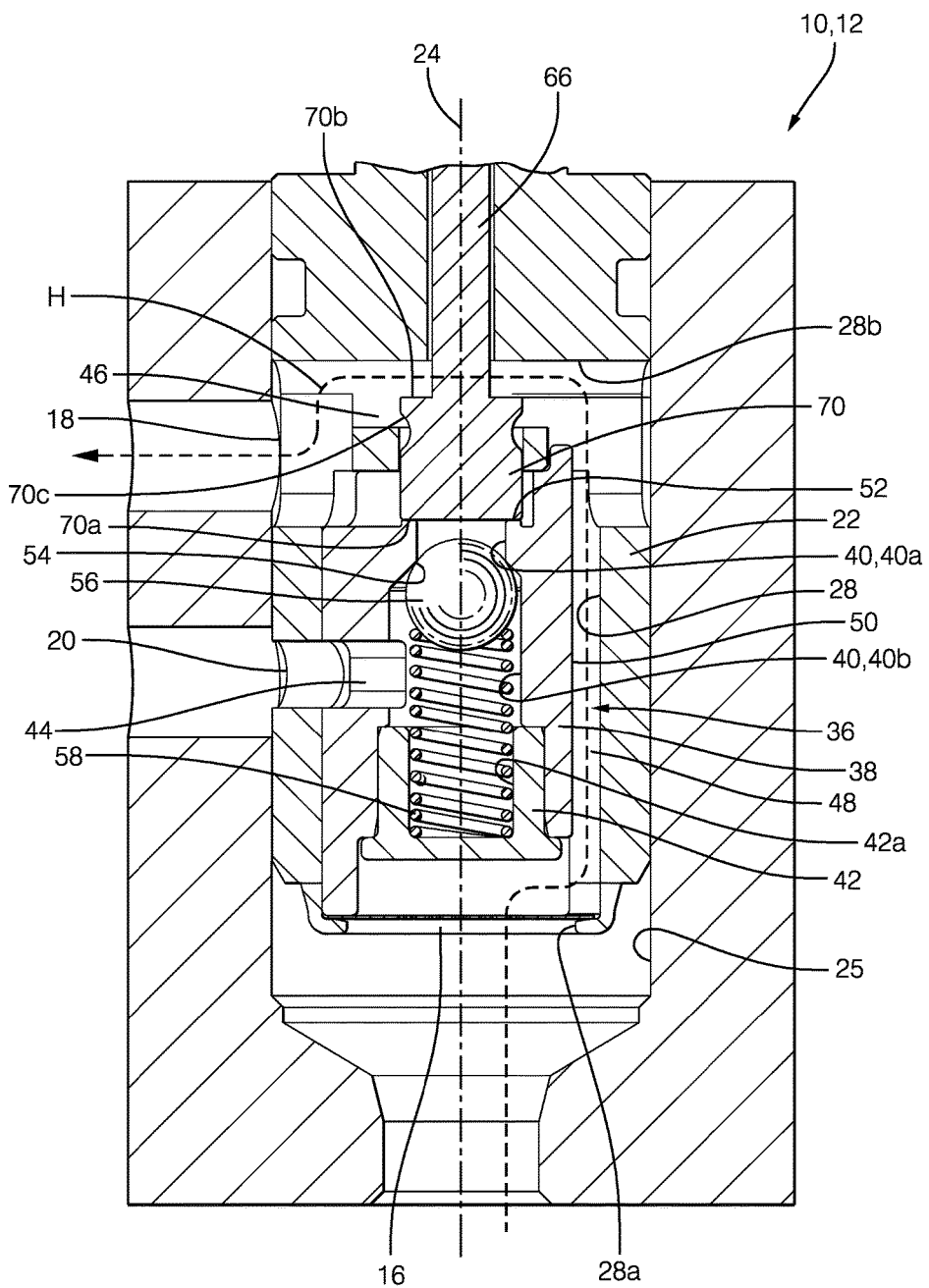
FIG. 2 is an enlargement of a portion of FIG. 1 showing an axial cross section of a hydraulic section of the valve assembly positioned in a high pressure mode of operation.
Figure 3:
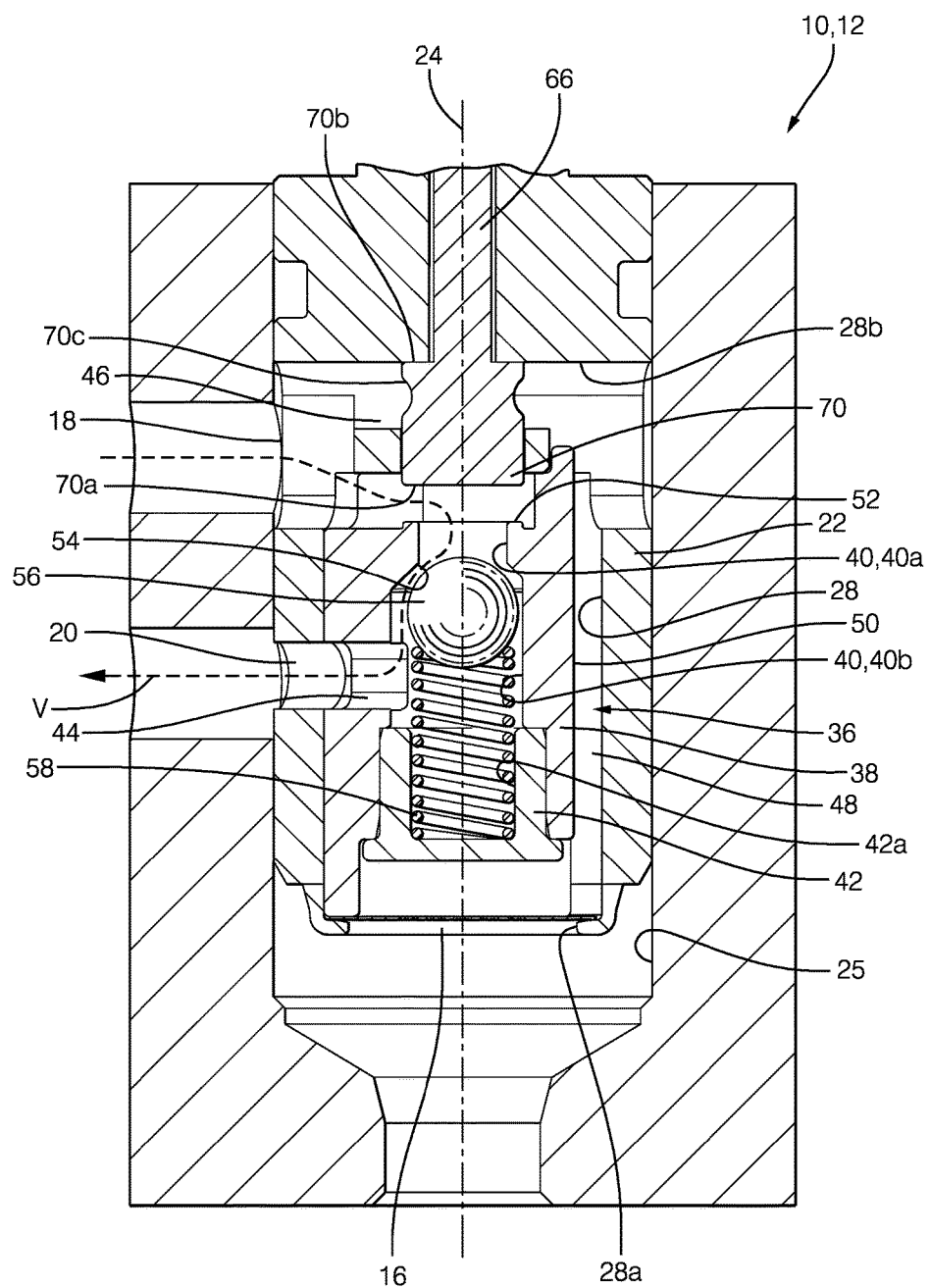
FIG. 3 is the view of FIG. 2 now showing the valve assembly positioned in a venting mode of operation where a pressure regulating valve member is unseated with a pressure regulating valve seat.
Figure 4:
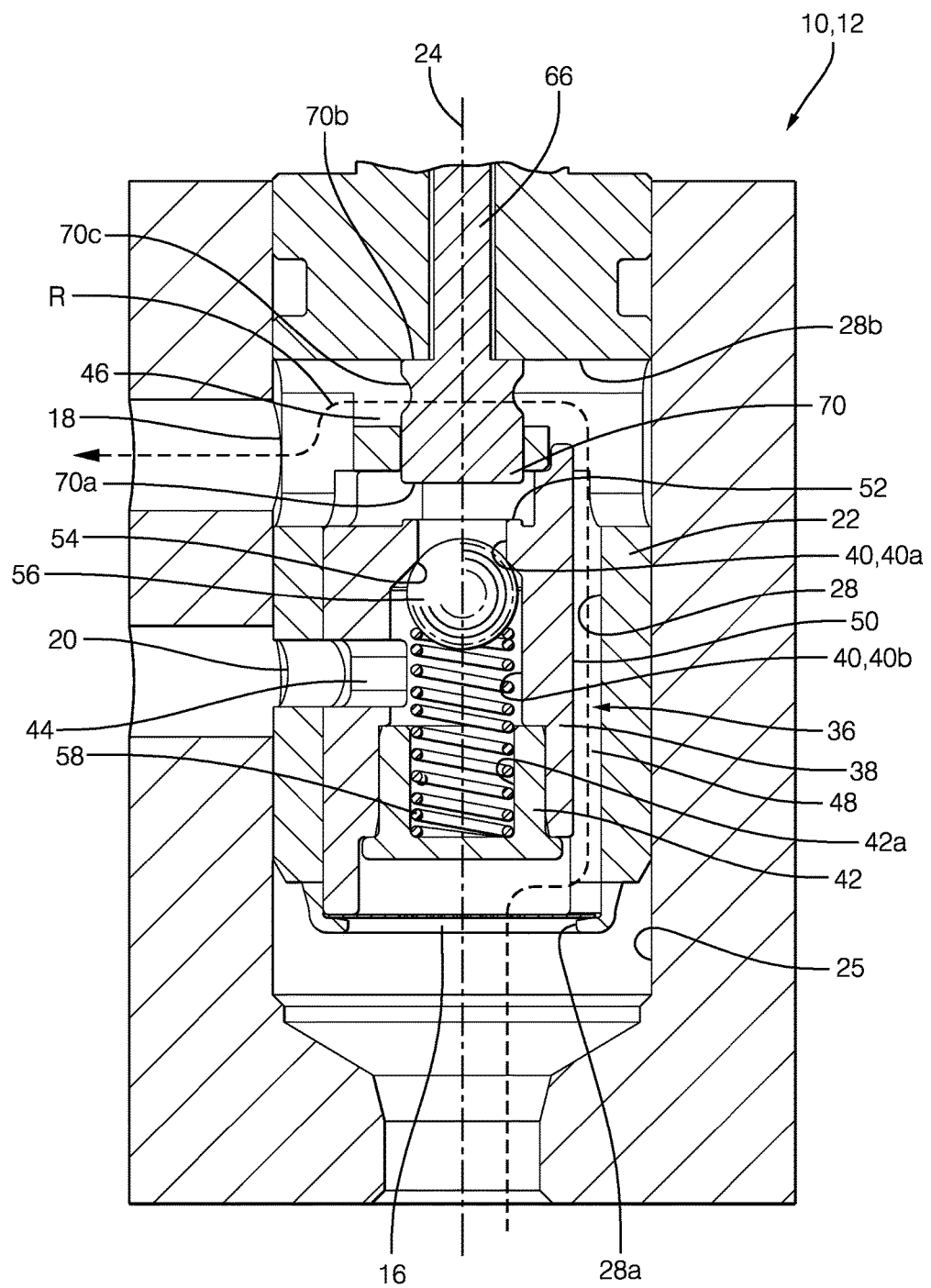
FIG. 4 is the view of FIG. 3 now showing the pressure regulating valve member seated with the pressure regulating valve seat.

In accordance with a preferred embodiment of this invention and referring to FIGS. 1-4, a valve assembly 10 is shown which is switchable between a high pressure mode of operation (FIGS. 1 and 2) and a venting mode of operation (FIGS. 3 and 4). Valve assembly 10 includes a hydraulic section 12 which is connected to an actuator section 14. Actuator section 14 affects fluid communication between a supply port 16 and a control port 18 and between control port 18 and a vent port 20. In this way, high pressure working fluid is selectively supplied to or vented from working device 21 which is switchable between a first mode of operation and a second mode of operation at a first predetermined pressure. Working device 21 is placed in the first mode of operation when valve assembly 10 is in the venting mode of operation high and working device 21 is placed in the second mode of operation when valve assembly 10 is placed in the high pressure mode of operation.

Still referring to FIGS. 1-4, hydraulic section 12 includes a housing 22 extending along a central housing axis 24. Housing 22 may be preferably made of metal, but may alternatively be made of plastic. One end of housing 22 is fixed to actuator section 14 while the other end of housing 22 is configured to be received within a valve bore 25 of, by way of non-limiting example only, an internal combustion engine 26. Housing 22 includes housing control bore 28 which extends coaxially, i.e. centered about central housing axis 24, part way into housing 22 from a housing control bore open end 28a of housing 22 that is distal from actuator section 14 to a housing control bore closed end 28b that is proximal to actuator section 14. Supply port 16 is defined by housing control bore 28 at housing control bore open end 28a such that supply port 16 extends coaxially into housing 22 and such that supply port 16 receives working fluid from a working fluid source 34 which may be, by way of non-limiting example only, the lubrication system of internal combustion engine 26. Control port 18 extends radially outward through housing 22 from housing control bore open end 28a such that control port 18 provides fluid communication from housing control bore 28 to the outer periphery of housing 22 to working device 21. Vent port 20 extends radially outward through housing 22 from a location within housing control bore 28 at a location that is axially between supply port 16 and control port 18. As used herein, axially between does not imply that control port 18 and vent port 20 are located at the same radial location of housing 22, but instead, axially between indicates that a first plane that is perpendicular to central housing axis 24 and extends through vent port 20 is axially between a second plane that is perpendicular to central housing axis 24 and extends through supply port 16 and a third plane that is perpendicular to central housing axis 24 and extends through control port 18.

A valve seat assembly 36 is disposed coaxially within housing control bore 28. Valve seat assembly 36 includes a valve seat body 38 that may be preferably made of plastic, but may alternatively be made of metal. Valve seat body 38 defines a valve seat bore 40 which is coaxial with housing control bore 28 and which is plugged with a spring seat 42 such that spring seat 42 prevents fluid communication between opposite sides of spring seat 42 through valve seat bore 40. Valve seat body 38 also defines a valve seat vent passage 44 which extends radially through valve seat body 38 from valve seat bore 40 such that valve seat vent passage 44 is aligned with vent port 20, thereby providing fluid communication between valve seat bore 40 and vent port 20.

Valve seat assembly 36 together with housing 22 define a control chamber 46 within housing control bore 28 such that control chamber 46 is axially between valve seat body 38 and housing control bore closed end 28b. Control chamber 46 is in constant fluid communication with supply port 16 and is also in constant fluid communication with control port 18. Conversely, control chamber 46 is selectively in fluid communication with vent port 20 only through valve seat bore 40. The outer periphery of valve seat body 38 mates with the inner periphery of housing control bore 28 so as to prevent working fluid from bypassing valve seat bore 40 to reach vent port 20, i.e. working fluid must pass through valve seat bore 40 to reach vent port 20. Constant fluid communication from supply port 16 to control chamber 46 is provided by a supply passage 48 which extends axially from supply port 16 to control chamber 46 such that supply passage 48 is laterally offset from central housing axis 24. As shown, supply passage 48 may be formed by a gap at the interface between housing control bore 28 and valve seat body 38, for example, by a feature 50 on the outer surface of valve seat body 38 that does not conform to housing control bore 28 where feature 50 may be, by way of non-limiting example only, a flat or a groove. Alternatively, feature 50 may be provided on housing control bore 28. Also alternatively, feature 50 may be provided on housing control bore 28 in addition to feature 50 being provided on valve seat body 38, i.e. a first feature 50 on valve seat body 38 and a second feature 50 on housing control bore 28. Also alternatively, supply passage 48 may be a bore contained entirely within valve seat body 38, for example, a bore that connects opposing axial ends of valve seat body 38. Selective fluid communication between control chamber 46 and vent port 20 will be described in greater detail later.

Valve seat body 38 also defines a vent valve seat 52 which circumferentially and concentrically surrounds the end of valve seat bore 40 that opens into control chamber 46 such that vent valve seat 52 faces toward control chamber 46. As shown, vent valve seat 52 may be a planar surface which is perpendicular to central housing axis 24, however, vent valve seat 52 may take other forms, by way of non-limiting example only, frustoconical or spherical.

Valve seat body 38 also defines a pressure regulating valve seat 54 which circumferentially and concentrically surrounds valve seat bore 40 such that pressure regulating valve seat 54 is opposed to vent valve seat 52, i.e. pressure regulating valve seat 54 faces away from vent valve seat 52 and also faces away from control chamber 46. In this way, a first portion 40a of valve seat bore 40 is located axially between vent valve seat 52 and pressure regulating valve seat 54. Also in this way, pressure regulating valve seat 54 is fluidly between vent valve seat 52 and valve seat vent passage 44. Furthermore, pressure regulating valve seat 54 separates first portion 40a of valve seat bore 40 from a second portion 40b of valve seat bore 40 which is fluidly between pressure regulating valve seat 54 and valve seat vent passage 44 where second portion 40b is larger in diameter than first portion 40a. As shown pressure regulating valve seat 54 may be frustoconical in shape, however, pressure regulating valve seat 54 may take other forms, by way of non-limiting example only, spherical in shape or planar and perpendicular to central housing axis 24.

Valve seat assembly 36 includes a pressure regulating valve member 56 within second portion 40b of valve seat bore 40 such that pressure regulating valve member 56 is selectively seated and unseated with pressure regulating valve seat 54 based on pressure within control chamber 46 as will be described in greater detail later. As shown, pressure regulating valve member 56 may be a ball, however, pressure regulating valve member 56 may be frustoconical in shape or any other shape that is able to prevent flow past pressure regulating valve seat 54 when pressure regulating valve member 56 is seated with pressure regulating valve seat 54. A pressure regulating valve spring 58 urges pressure regulating valve member 56 toward pressure regulating valve seat 54. Pressure regulating valve spring 58 is located within second portion 40b of valve seat bore 40 and is grounded to valve seat body 38 by spring seat 42 which is fixed to valve seat body 38 within second portion 40b of valve seat bore 40. As shown, spring seat 42 is fixed to valve seat body 38 by an interference fit with second portion 40b of valve seat bore 40, however, spring seat 42 may alternatively be fixed to valve seat body 38, by way of non-limiting example only, using complementary screw threads, adhesives, or welding. Spring seat 42 is sealed to valve seat body 38; thereby preventing working fluid from being communicated directly to vent port 20 by bypassing first portion 40a of valve seat bore 40, i.e. spring seat 42 prevents working fluid from passing from supply port 16 to vent port 20 through valve seat bore 40 without passing through vent valve seat 52 and through first portion 40a of valve seat bore 40. Spring seat 42 may include a spring seat bore 42a which is centered about central housing axis 24 and which extends axially part way into spring seat 42 such that spring seat bore 42a faces toward pressure regulating valve member 56 and such that spring seat bore 42a receives a portion of pressure regulating valve spring 58 therewithin. In this way, spring seat bore 42a centers pressure regulating valve spring 58 about central housing axis 24.

Actuator section 14 includes a solenoid 60 having a coil 62 and an axially moveable armature 64 located coaxially within coil 62. Armature 64 is fixed to a plunger 66 such that axial movement of armature 64 results in axial movement of plunger 66 between a high pressure position and a vent position. An attachment end 22a of housing 22 extends coaxially within coil 62 and is held in fixed relationship to coil 62 such that relative movement between housing 22 and coil 62 is prevented. Attachment end 22a of housing 22 is a magnetic pole which is part of the magnetic circuit of solenoid 60. A guide bore 22b extends through attachment end 22a such that guide bore 22b opens into control chamber 46 and such that guide bore 22b is centered about central housing axis 24. Plunger 66 extends through guide bore 22b in a close sliding fit such that plunger 66 is able to freely move axially within guide bore 22b while preventing radial movement of plunger 66 within guide bore 22b and also preventing working fluid from passing through the interface of plunger 66 and guide bore 22b.

Solenoid 60 also includes return spring 68 which is located axially between armature 64 and attachment end 22a of housing 22. Return spring 68 biases armature 64 away from attachment end 22a as will be described in greater detail later.

When coil 62 is energized with an electric current, a magnetic field is generated, resulting in an attractive force between armature 64 and attachment end 22a of housing 22. Consequently, armature 64 is moved axially toward attachment end 22a of housing 22, thereby compressing return spring 68. Conversely, when coil 62 is not energized with an electric current, armature 64 is moved axially away from attachment end 22a of housing 22 by the force of return spring 68. Solenoids and their operation are well known to those skilled in the art and will not be further discussed herein.

Plunger 66 extends axially through guide bore 22b and into housing control bore 28, and more specifically, into control chamber 46. Plunger 66 includes vent valve member 70 which extends radially outward from plunger 66 such that vent valve member 70 is located within control chamber 46 and is axially aligned with vent valve seat 52. Vent valve member 70 includes a sealing face 70a at one axial end of vent valve member 70 which faces toward vent valve seat 52 such that sealing face 70a is planar and perpendicular to central housing axis 24 in order for sealing face 70a to seal with vent valve seat 52 when vent valve member 70 is seated with vent valve seat 52. While sealing face 70a has been shown and described as being planar and perpendicular to vent valve seat 52, sealing face 70a may take alternative shapes, by way of non-limiting example only, frustoconical or spherical. Vent valve member 70 also includes a stop shoulder 70b at the other axial end of vent valve member 70 that is opposite sealing face 70a such that stop shoulder 70b limits the travel of plunger 66 toward actuator section 14. Vent valve member 70 also includes an oil groove 70c on the outer periphery thereof which surrounds central housing axis 24. Oil groove 70c provides communication through control chamber 46 from supply passage 48 to control port 18 and from supply passage 48 to vent port 20.

In operation and referring to FIG. 2, valve assembly 10 is shown in the high pressure mode of operation with emphasis on hydraulic section 12. In the high pressure mode of operation, coil 62 of solenoid 60 (FIG. 1) is energized with an electric current. In this way, armature 64 (FIG. 1) is attracted to attachment end 22a (FIG. 1) of housing 22, thereby causing armature 64, plunger 66, and vent valve member 70 to move valve axially downward, as viewed in FIG. 2, to compress return spring 68 until vent valve member 70 is seated with vent valve seat 52, i.e. sealing face 70a of vent valve member 70 seals with vent valve seat 52. Consequently, as result of vent valve member 70 seating with vent valve seat 52, the pressure of working fluid within control chamber 46 is elevated in pressure to be greater than or equal to the first predetermined pressure due to fluid communication between control chamber 46 and vent port 20 being prevented and also due to control chamber 46 being in fluid communication with supply port 16 via supply passage 48. Also consequently, working fluid that is pressurized to be greater than or equal to the first predetermined pressure is communicated to working device 21 from control chamber 46, thereby causing working device 21 to be switched to the second mode of operation. For clarity, arrow H has been provided in FIG. 2 to show the path taken by the supplied working fluid under high pressure.

In operation and referring to FIGS. 3 and 4, valve assembly 10 is shown in the venting mode of operation. In the venting mode of operation, coil 62 of solenoid 60 (FIG. 1) is not energized with an electric current. In this way, armature 64 (FIG. 1), plunger 66, and vent valve member 70 are urged upward, as oriented in FIGS. 3 and 4, by the force of return spring 68 (FIG. 1) away from valve seat assembly 36 to be placed in the vent position. This upward movement of armature 64, plunger 66, and vent valve member 70 causes sealing face 70a to separate from vent valve seat 52, thereby unseating vent valve member 70 from vent valve seat 52 and providing fluid communication from control chamber 46 to first portion 40a of valve seat bore 40. Consequently, the working fluid in control chamber 46, which had been pressurized to be greater than or equal to the first predetermined pressure in the high pressure mode of operation, is able to act upon pressure regulating valve member 56, thereby compressing pressure regulating valve spring 58 to provide fluid communication from first portion 40a of valve seat bore 40 to vent port 20 through second portion 40b of valve seat bore 40 and also through valve seat vent passage 44. In this way, the working fluid in control chamber 46 is vented to vent port 20, thereby decreasing the pressure within control chamber 46 to be below the first predetermined pressure and also thereby placing working device 21 in the first mode of operation. For clarity, arrow V has been provided in FIG. 3 to show the path taken by oil that has been vented from control port 18 to vent port 20.

Pressure regulating valve spring 58 has a spring force which, when vent valve member 70 is unseated with vent valve seat 52, keeps pressure regulating valve member 56 seated with pressure regulating valve seat 54 when the pressure of the working fluid in control chamber 46 is below a second predetermined pressure that is less than the first predetermined pressure as shown in FIG. 1 but greater than vent pressure which is effectively atmospheric pressure. However, when vent valve member 70 is unseated with vent valve seat 52 and the pressure of the working fluid in control chamber 46 exceeds the second predetermined pressure, pressure regulating valve member 56 is unseated with pressure regulating valve seat 54 in order to maintain pressure within control chamber 46 at a pressure that does not allow working device 21 to be placed in the second mode of operation, i.e. below the first predetermined pressure. In this way, pressure regulating valve seat 54, pressure regulating valve member 56, and pressure regulating valve spring 58 work together to maintain the working fluid within control chamber 46 at a pressure that is able to provide lubrication to working device 21 without causing working device 21 to be switched to the second mode of operation. For clarity, arrow R has been provided in FIG. 4 to show the path taken by the supplied working fluid under regulated pressure. As should now be clear, when vent valve member 70 is unseated with vent valve seat 52, pressure regulating valve spring 58 maintains the pressure of the working fluid within control chamber 46 below the first predetermined pressure by seating and unseating pressure regulating valve member 56 with pressure regulating valve seat 54.

As should now be readily apparent, valve assembly 10 provides vent port 20 at an axial location that is between supply port 16 and control port 18 which may be necessary in order to accommodate some environments. Valve assembly 10 also provides regulated pressure to control port 18 while utilizing a simple and economical on/off solenoid 60, thereby providing continuous lubrication to working device 21 while maintaining the desired operational state of working device 21. Valve assembly 10 accomplishes these objectives while maintaining ease of manufacture.

While this invention has been described in terms of preferred embodiments thereof, it is not intended to be so limited, but rather only to the extent set forth in the claims that follow.

We claim:

1. A valve assembly which receives working fluid from a working fluid source and then communicates said working fluid to and from a working device that is switchable from a first mode of operation to a second mode of operation at a predetermined pressure of said working fluid, said valve assembly comprising:
    a housing with a housing control bore extending along an axis, a supply port in fluid communication with said housing control bore which receives said working fluid from said working fluid source, a control port in fluid communication with said housing control bore which communicates said working fluid to and from said working device, and a vent port in fluid communication with said housing control bore which selectively returns said working fluid to said working fluid source, wherein said vent port is located at an axial position of said housing that is between said supply port and said control port;
    a valve seat assembly including a valve seat body disposed coaxially within said housing control bore, said valve seat body defining:
        a control chamber in constant fluid communication with said control port;
        a vent path from said control port to said vent port; and
        a vent valve seat in said vent path;
    a supply passage which provides constant fluid communication from said supply port to said control chamber; and
    a vent valve member which is selectively seated and unseated with said vent valve seat such that said working fluid passes from said control chamber to said vent port through said vent path when said vent valve member is unseated with said vent valve seat and such that said working fluid is prevented from being communicated to said vent port when said vent valve member is seated with said vent valve seat.

2. A valve assembly as in claim 1 wherein said supply passage is defined by said valve seat body and by said housing control bore.

3. A valve assembly as in claim 2 wherein said supply passage is radially between said valve seat body and said housing control bore.

4. A valve assembly as in claim 1 wherein said supply passage is laterally offset from said axis.

5. A valve assembly as in claim 1 wherein said supply port is in fluid communication with said control port when said vent valve member is seated with said vent valve seat and said supply port is in fluid communication with said control port when said vent valve member is unseated with said vent valve seat.

6. A valve assembly as in claim 1 further comprising a solenoid which seats said vent valve member with said vent valve seat and which unseats said vent valve member with said vent valve seat, wherein said control port is proximal to said solenoid and said supply port is distal from said solenoid.

7. A valve assembly as in claim 1 wherein said vent valve member is centered about said axis.

8. A valve assembly which receives working fluid from a working fluid source and then communicates said working fluid to and from a working device that is switchable from a first mode of operation to a second mode of operation at a predetermined pressure of said working fluid, said valve assembly comprising:
    a housing with a housing control bore extending along an axis, a supply port in fluid communication with said housing control bore which receives said working fluid from said working fluid source, a control port in fluid communication with said housing control bore which communicates said working fluid to and from said working device, and a vent port in fluid communication with said housing control bore which selectively returns said working fluid to said working fluid source, wherein said vent port is located at an axial position of said housing that is between said supply port and said control port;

a valve seat assembly including a valve seat body disposed coaxially within said housing control bore, said valve seat body defining:
  a control chamber in constant fluid communication with said control port;
  a vent path from said control port to said vent port; and
  a vent valve seat in said vent path;
a supply passage which provides constant fluid communication from said supply port to said control chamber; and
a vent valve member which is selectively seated and unseated with said vent valve seat such that said working fluid passes from said control chamber to said vent port through said vent path when said vent valve member is unseated with said vent valve seat and such that said working fluid is prevented from being communicated to said vent port when said vent valve member is seated with said vent valve seat;
wherein said valve seat body further defines a pressure regulating valve seat in said vent path fluidly between said vent valve seat and said vent port, said valve assembly further comprising:
  a pressure regulating valve member which is selectively seated and unseated with said pressure regulating valve seat based on pressure within said control chamber when said vent valve member is unseated with said vent valve seat such that said working fluid passes from said control chamber to said vent port through said vent path when said pressure regulating valve member is unseated with said pressure regulating valve seat and such that said working fluid is prevented from being communicated to said vent port when said pressure regulating valve member is unseated with said pressure regulating valve seat.

9. A valve assembly as in claim 8 further comprising a pressure regulating valve spring which urges said pressure regulating valve member toward said pressure regulating valve seat, wherein, when said vent valve member is unseated with said vent valve seat, said pressure regulating valve spring maintains the pressure of said working fluid within said control chamber below said predetermined pressure by seating and unseating said pressure regulating valve member with said pressure regulating valve seat.

10. A valve assembly as in claim 9 wherein, said pressure regulating valve spring has a spring force which, when said vent valve member is unseated with said vent valve seat, keeps said pressure regulating valve member seated with said pressure regulating valve seat when the pressure within said control chamber is below a second predetermined pressure that is less than said predetermined pressure and allows said pressure regulating valve member to be unseated with said pressure regulating valve seat when the pressure within said control chamber is greater than said second predetermined pressure.

11. A valve assembly as in claim 10 wherein said vent path is defined in part by a valve seat bore which is centered about said axis such that said valve seat bore extends through said valve seat body, said valve seat assembly further comprising a spring seat within said valve seat bore which grounds said pressure regulating valve spring to said valve seat body.

12. A valve assembly as in claim 9 wherein said vent path is defined in part by a valve seat bore which is centered about said axis such that said valve seat bore extends through said valve seat body, said valve seat assembly further comprising a spring seat within said valve seat bore which grounds said pressure regulating valve spring to said valve seat body.

13. A valve assembly as in claim 12 wherein said spring seat is sealed to said valve seat body such that said spring seat prevents said working fluid from passing from said supply port to said vent port through said valve seat bore without passing through said vent valve seat.

14. A valve assembly as in claim 12 wherein said vent path is further defined by a valve seat vent passage which extends through said radially through said valve seat body from said valve seat bore to said vent port.

15. A valve assembly as in claim 8 wherein said vent valve seat faces toward said control chamber and said pressure regulating valve seat faces away from said vent valve seat.

16. A valve assembly as in claim 8 wherein said vent valve seat is centered about said axis and said pressure regulating valve seat is centered about said axis.

17. A valve assembly as in claim 8 wherein said supply port is in fluid communication with said control port when said vent valve member is seated with said vent valve seat and said supply port is in fluid communication with said control port when said vent valve member is unseated with said vent valve seat.

* * * * *